(12) United States Patent
Ferreira et al.

(10) Patent No.: US 10,721,005 B2
(45) Date of Patent: Jul. 21, 2020

(54) SIGNAL STRENGTH BASED PRINTINGS

(71) Applicant: Hewlett-Packard Development Company, L.P., Houston, TX (US)

(72) Inventors: Ronaldo Rob Ferreira, Porta Alegre (BR); Endrigo Nadin Pinheiro, Porto Alegre (BR); Adilson Arthur Mohr, Porto Alegre (BR); Fabio Delazeri Riffel, Porto Alegre (BR); Jose Paulo Xavier Pires, Porto Alegre (BR); Christopher Charles Mohrman, Houston, TX (US); Valiuddin Y Ali, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 58 days.

(21) Appl. No.: 16/074,053

(22) PCT Filed: Apr. 22, 2016

(86) PCT No.: PCT/US2016/028955
§ 371 (c)(1),
(2) Date: Jul. 30, 2018

(87) PCT Pub. No.: WO2017/184174
PCT Pub. Date: Oct. 26, 2017

(65) Prior Publication Data
US 2019/0044630 A1 Feb. 7, 2019

(51) Int. Cl.
*H04B 17/318* (2015.01)
*G06F 3/12* (2006.01)

(52) U.S. Cl.
CPC ......... *H04B 17/318* (2015.01); *G06F 3/1204* (2013.01); *G06F 3/1222* (2013.01);
(Continued)

(58) Field of Classification Search
CPC ........ G06F 3/12; G06F 3/1204; G06F 3/1222; G06F 3/1238; G06F 3/1288; G06F 3/1292; H04N 1/32; H04B 17/318
(Continued)

(56) References Cited

U.S. PATENT DOCUMENTS

| 8,427,680 B2 | 4/2013 | McCorkindale et al. |
| 2004/0203358 A1 | 10/2004 | Anderson et al. |

(Continued)

FOREIGN PATENT DOCUMENTS

| CN | 201600682 U | 10/2010 |
| TW | 201145153 A | 12/2011 |
| WO | WO-2007-092819 A1 | 8/2007 |

OTHER PUBLICATIONS

Suzukiy et al ~ "SCPS Printing Sensitive Documents Safely on Shared Network Printers" ~ http://www.ht.sfc.keio.ac.jp ~ 2003 ~ 6 pages.

*Primary Examiner* — Harun Chowdhury
(74) *Attorney, Agent, or Firm* — Brooks Cameron & Huebsch PLLC (US LC)

(57) ABSTRACT

Example implementations relate to signal strength based printings. In an example, signal strength based printings can employ a personal computing device including a network adapter coupled to a computer network, an antenna to receive a wireless signal from a mobile electronic device, a processor to compare a signal strength indication (RSSI) value of the received wireless signal to a RSSI threshold value, and send, via the network adapter, a printable file to a printer based on the comparison of the RSSI value to the RSSI threshold value.

11 Claims, 3 Drawing Sheets

(52) U.S. Cl.
CPC .......... G06F 3/1238 (2013.01); G06F 3/1267 (2013.01); G06F 3/1288 (2013.01)

(58) Field of Classification Search
USPC ..... 370/235, 252, 328, 329; 455/41.2, 67.11
See application file for complete search history.

(56) References Cited

U.S. PATENT DOCUMENTS

| | | |
|---|---|---|
| 2004/0236850 A1 | 11/2004 | Krumm et al. |
| 2006/0044598 A1 | 3/2006 | Etelapera |
| 2007/0182984 A1 | 8/2007 | Ragnet et al. |
| 2007/0182986 A1 | 8/2007 | Ciriza |
| 2009/0186584 A1 | 7/2009 | Lambrecht |
| 2010/0120406 A1 | 5/2010 | Banga et al. |
| 2013/0050741 A1 | 2/2013 | Raja et al. |
| 2013/0077124 A1 | 3/2013 | Vojak |
| 2013/0229930 A1 | 9/2013 | Akay et al. |
| 2014/0070002 A1 | 3/2014 | Pineau et al. |
| 2014/0293314 A1 | 10/2014 | Amarendra et al. |
| 2017/0134609 A1* | 5/2017 | Park ........................ G06F 3/12 |
| 2017/0187890 A1* | 6/2017 | Han ...................... G06F 3/1204 |
| 2017/0265027 A1* | 9/2017 | Najari .................. G06F 3/1292 |

* cited by examiner

SIGNAL STRENGTH BASED PRINTINGS

BACKGROUND

Electronic devices such as mobile phones, personal computers, etc. can communicate with other electronic devices via wired and/or wireless communications. For example, an electronic device such as a personal computer can communicate with a printer to print an electronic document.

DETAILED DESCRIPTION

Printers may print various documents including those that may include sensitive information such as personal information, financial information, and/or confidential information, among other types of sensitive information. It may be desirable to print documents including sensitive information in a secure manner so an intended receipt of the document receives the document and/or that other individuals do not receive and/or view the document.

Some approaches attempting to print documents in a secure manner may employ a personal identification number (PIN) and/or a near-field communication (NFC) communication in an effort to securely print documents. For example, a PIN may be input at a printer (e.g., via a graphical user interface of a printer) and/or a NFC enabled device may communicate with a NFC enabled printer (i.e., having NFC communication capabilities) to enable the printer to print a printable file queued at the printer. However, such approaches may rely on a user provided input such as PIN and/or rely on inclusion of costly wireless technology (e.g., NFC and/or Bluetooth capabilities) in a printer. Further, such approaches may rely on queuing a printable file on a printer prior to an input (e.g., input of a PIN and/or NFC communication) to the printer that enables printing of the printable file queued at the printer.

Accordingly, the present disclosure is directed to signal strength based printings. For example, signal strength based printings can employ a personal computing device (e.g., a laptop) including a network adapter coupled to a computer network, an antenna to receive a wireless signal from a mobile electronic device (e.g., a mobile phone), a processor to compare a signal strength indication (RSSI) value of the received wireless signal to a RSSI threshold value, and send, via the network adapter, a printable file to a printer based on the comparison of the RSSI value to the RSSI threshold value.

Notably, and in contrast to other approaches, signal strength based printings operates without relying on inclusion of costly wireless technology (e.g., NFC and/or Bluetooth) in a printer to determine proximity of a mobile electronic device to a printer. Additionally, in various examples, signal strength based printings can desirably authenticate printing of a printable file queued at a personal computing device and send the printable file over a computing network to a printer in response to the authentication, in contrast to other approaches that may queue a file at a printer and await authorization to print.

Figure 1:
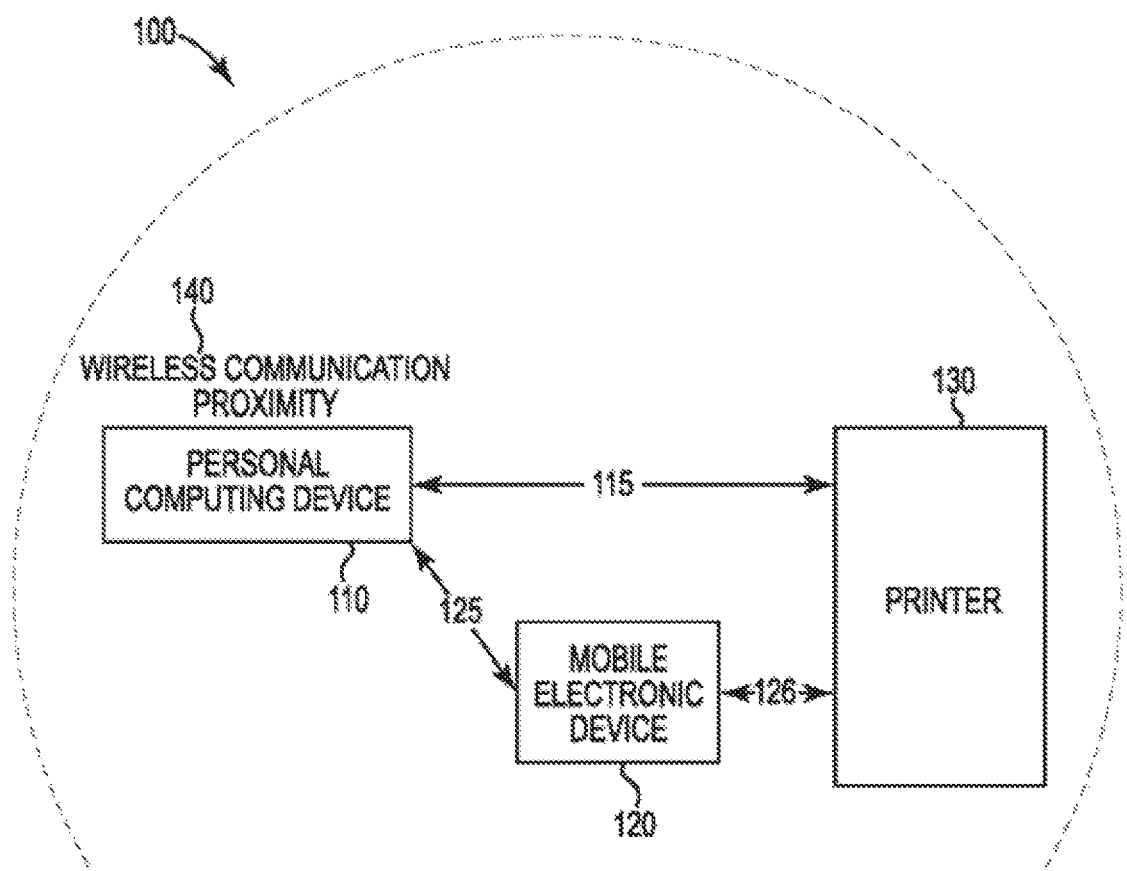
FIG. 1 illustrates a diagram of an example of a system suitable with signal strength based printings according to the disclosure.

FIG. 1 illustrates a diagram of an example of a system 100 suitable with signal strength based printings according to the disclosure. As illustrated in FIG. 1, the system 100 can include a personal computing device 110, a mobile electronic device 120, and a printer 130.

The personal computing device 110 refers to a laptop, desktop, and/or other personal computing device suitable to promote signal strength based printings. The personal computing device can include a network adaptor and an antenna, as described herein, among other components.

The personal computing device 110 can be a distance (not shown) from the printer 130 that is within the wireless communication proximity 140. The distance can be a fixed distance and/or a variable distance. For example, the personal computing device 110 can be a desktop that is a fixed distance and/or at a fixed orientation from and/or relative to the printer 130. However, the personal computing device 110 can be a laptop that is a variable distance and/or a variable orientation from and/or relative to the printer 130.

The mobile electronic device 120 can be within a proximity 125 of the personal computing device 110. Similarly, the mobile electronic device can be with a proximity 126 of the printer 130. The proximity 125 and/or the proximity 128 of the mobile electronic device 120 can vary as the mobile electronic device 120 moves relative to the personal computing device 110 and/or relative to the printer 130.

The personal computing device 110 includes a network adapter to couple that personal computing device 110 to a computing network 115. The computing network 115 refers to hardware and/or computer readable instructions that enable the personal computing device 110 to communicate (e.g., exchange data) via the computing network with another device coupled to the computing network 115. The computing network 115 can include routers, switches, servers, hubs, links, etc. to promote communication between the printer 130 and the personal computing device 110. Examples of computing networks include local area networks (LAN), among other suitable types of computing networks. In some examples, the computing network 115 can be an enterprise network including a plurality of personal computing devices.

The personal computing device 110 can communicate with the printer 130 over the computing network. For example, the personal computing device 110 can send printable files (i.e., a print job) to the printer 130 over the computing network 115.

The mobile electronic device 120 refers to a smartphone, handheld computer, personal digital assistant, carputer, wearable computer, laptop, tablet computer, and/or laptop/tablet hybrids, among other mobile electronic device suitable to promote signal strength based printings. The mobile electronic device can include an antenna, as described herein, among other components.

The printer 130 refers to a device capable communicating with the personal computing device 110 and printing a printable file (e.g., received from the personal computing device 110). Notably and in contrast to some printers which may be expensive and/or have a large physical footprint due at least in part to inclusion of hardware supporting wireless communication capacities (e.g., near-filed communications), printer 130 may not include hardware supporting wireless communication capabilities.

The printer 130 and/or the mobile electronic device 120 can be within a wireless communication proximity 140 of the personal computing device 110. In various examples, at least the mobile electronic device 120 is within the wireless communication proximity 140. That is, although examples are not limited so, the wireless communication proximity 140 can refer to a particular range within which the personal computing device 110 can communicate with the mobile electronic device 120. For example, the personal computing device 110 can detect the mobile electronic device 120 when the mobile electronic device 120 moves toward the personal computing device 110 and/or when the mobile electronic device moves toward the printer 130 while within the wireless communication proximity 140.

Notably, while the wireless communication proximity is illustrated as being circular in nature the disclosure is not so limited. Rather, the size, shape, a point of origin, and/or a total number of points of origin of the wireless communication proximity 140 can be varied to promote signal strength based printings. For instance, while not illustrated in FIG. 1 as such, a point of origin (e.g., a center of the wireless communication proximity) can, in some examples correspond to the personal computing device 110.

In some example, a plurality of wireless enabled personal communication devices (not illustrated) similar to personal computing device 110 can together form a wireless communication proximity by coupling (i.e., daisy-chaining) the plurality of personal computing devices together and leveraging respective wireless capabilities of the plurality of personal computing devices. For example, at least one additional personal computing device can be located within the wireless communication proximity 140 and positioned substantially between the personal computing device 110 and the printer 130 to extend a wireless communication proximity of the personal computing device 110. In such examples, a wireless communication proximity can have an extended range relative to a wireless communication proximity of the personal computing device 110.

Figure 2:
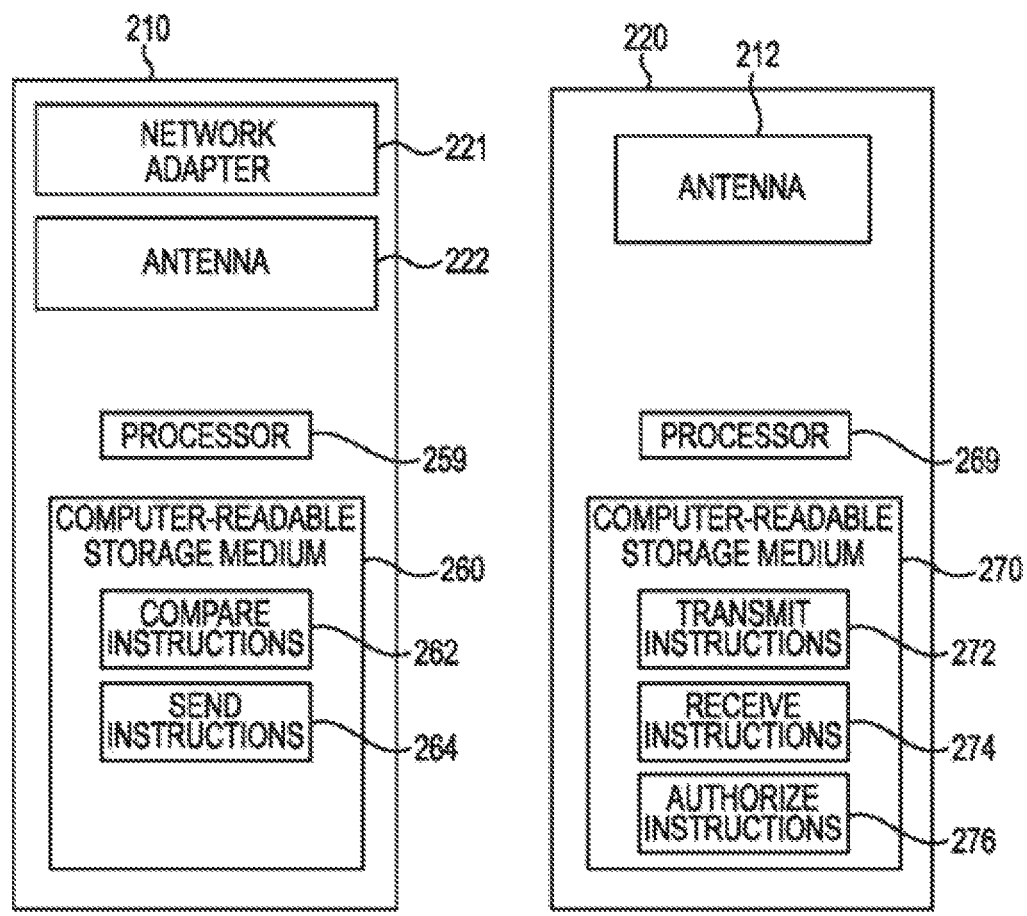
FIG. 2 illustrates a diagram of an example of a personal computing device and of an example of a mobile electronic device according to the disclosure.

FIG. 2 illustrates a diagram of an example of a personal computing device 210 and a mobile electronic device 220 according to the disclosure. As illustrated in FIG. 2, the personal computing device 210 can include a network adapter 221 an antenna 222; a processor 259, and a computer-readable storage medium 260 with compare instructions 262 and send instructions 264. The mobile electronic device 220 can include an antenna 212, a processor 269, and a computer-readable storage medium 270 with transmit instruction 272, receive instructions 274, and authorize instructions 276.

The network adapter 221 can be local or remote to the personal computing device 210. For example, the network adapter can be an electronic bus and/or a network interface card, among other possibilities, such that the personal computing device can communicate via a computing network (e.g., a LAN).

The antenna 222 can in various examples be formed of a Bluetooth antenna. In such examples, the antenna 222 communicate via wireless Bluetooth signals such as Bluetooth low energy signals (BLE). However, the disclosure is no so limited. Rather, the antenna can be any suitable type of wireless antenna such as a Wi-Fi antenna, a radio-frequency identification (RFID) antenna, among other types of suitable antenna to promote signal strength based printings.

In various examples, the antenna 222 can receive a wireless signal from the mobile electronic device 220, as described herein. The wireless signal can be an Electrical and Electronics Engineers (IEEE) 802.11 standard-based signal such as Wi-Fi including a Wi-Fi HaLow™, a IEEE 802.15 standard-based signal such as Bluetooth including BLE, a IEEE 802.15.4 standard-based signal such as Zigbee, and/or RFID signal), among other possible types of wireless signals.

The processor 259 can be a central processing unit (CPU), a semiconductor based microprocessor, and/or other hardware devices suitable for retrieval and execution of instructions stored in computer-readable storage medium 260. Similarly, the processor 269 can be a CPU, a semiconductor based microprocessor, and/or other hardware devices suitable for retrieval and execution of instructions stored in computer-readable storage medium 270

The processor 259 may fetch, decode, and execute instructions 262, 264, or a combination thereof. As an alternative or in addition to retrieving and executing instructions, processor 259 may include an electronic circuit that includes electronic components to perform the functionality of instructions 262, 264, or a combination thereof. Similarly, the processor 269 may fetch, decode, and execute instructions 272, 274, 276, or a combination thereof. As an alternative or in addition to retrieving and executing instructions, processor 269 may include an electronic circuit that includes electronic components to perform the functionality of instructions 272, 274, 276, or a combination thereof.

The computer-readable storage medium 260 and the computer-readable storage medium 270 may be any electronic, magnetic, optical, or other physical storage device that contains or stores executable instructions. Thus, the computer-readable storage medium 260 and the computer-readable storage medium 270 may be, for example. Random Access Memory (RAM), an Electrically Erasable Programmable Read-Only Memory (EEPROM), a storage device, an optical disc, etc. In some examples, computer-readable storage medium 260 and the computer-readable storage medium 270 may be a non-transitory storage medium, where the term "non-transitory" does not encompass transitory propagating signals. The computer-readable storage medium 260 can be encoded with a series of processor executable instructions 262 and 264. Similarly, the computer-readable storage medium 270 can be encoded with a series of processor executable instructions 272, 274, and 276.

In various examples, the processor 259 can execute compare instructions 262 to compare a RSSI value of the received wireless signal to a wireless signal threshold. For example, a RSSI value (e.g., −50 decibels) can be compared to a RSSI threshold value (e.g., −80 decibels).

A RSSI threshold value can, in various examples, be based on a user performed calibration. That is, the processor 259 can determine RSSI threshold value (e.g., −50 decibels) based on a user performed calibration. In some examples, the processor 259 can prompt a user to transmit a plurality of wireless signals corresponding to respective locations between a location of a printer and a location of the personal computing device to determine a RSSI threshold value. A user can be prompted via a graphical user interface (GUI) of the mobile electronic device 220, among other possibilities.

A user can be prompted to transmit a signal at a location of the printer and to transmit a signal at the location of the personal computing device. For example, a user can walk from a location of the printer to a location of the personal computing device and transmit signals at the location of the printer and the location of the personal computing device.

In some example, the mobile electronic device 220 can transmit a plurality of signals to the personal computing device while at locations between the location of the personal computing device 210 the location of the printer. For example, signals can be transmitted at a plurality of location that are sequentially farther from the printer and closer to the personal computing device (e.g., transmitted while a user is walking from a location of the printer to a location of the personal computing device 210). RSSI values of such signals may be suitable as a RSSI threshold values.

As used herein, the RSSI threshold value can be a particular value (e.g., −50 decibels) and/or a range of values. For instance, a RSSI threshold value can be equal to a particular RSSI value (e.g., −50 decibels) of a signal sent by the mobile electronic device 220 and received by the personal computing device 210 during the user performed calibration. For example, a RSSI threshold value can correspond to a RSSI value received by the personal computing device during the user calibration while the user was at a location between a location of the personal computing device 210 and a location of the printer.

The processor 259 can execute send instructions 264 to send, via the network adapter, a printable file to the printer based via the network adapter, a printable file to the printer based on the comparison of the RSSI value to the RSSI threshold value. For instance, in examples with a RSSI threshold value of −50 decibels a printable file can be sent to the printer when the RSSI values received at the personal computing device 210 from the mobile electronic device 220 are less than −50 decibels.

The RSSI value represents a measurement of an amount of power present in a received wireless signal such as those received by the antenna 222. The wireless signal threshold represents a base amount of power present in a received wireless signal that is suitable for the personal computing device 210 to send, via the network adapter, a printable file to a printer on the computer network.

A printable file (queued at the personal computer device 210) can be sent to a printer when the strength of the RSSI value (e.g., −80 decibels) is less than the wireless signal threshold (e.g., −50 decibels). In some examples, an entire printable file is queued in a memory of the personal computing device such as the computer-readable storage medium 260 until the entire printable file is sent to the printer when a strength of a received wireless signal is less than a wireless signal threshold. In such examples, security can be enhanced as compared to other approaches that may send at least a portion of a printable file to a printer (e.g., so the at least a portion of the printable file is queued at the printer until a PIN is entered at the printer and the printable file is printed).

In some examples, the processor 259 can execute send instructions 264 to send a notification to the mobile electronic device 220 that a printable file (e.g., an entire printable file) is queued in a memory. For instance, the processor 259 can provide a notification to the mobile 220 in response to determining a strength of a received wireless signal is less than a wireless signal threshold, among other possibilities. The notification can include a prompt or other provided via a GUI of the mobile electronic device 220, among other possible types of notifications.

As mentioned, the antenna (e.g., the antenna 212 and 222) refers to an antenna capable of various types of transmissions by which each component including the antenna can receive and send information. Although examples are not limited to a particular type of transmissions, each of the personal computing device 210 and the mobile electronic device 220 can include an embedded BLE card to receive and send information and/or BLE signals as described herein.

In various examples, the processor 269 can execute transmit instructions 272 to transmit via an antenna, a wireless signal to a personal computing device. For instance, the processor 289 can transmit a wireless signal via the antenna 212. As mentioned, the wireless transmission can be a BLE transmission, among other possibilities. In various examples, a RSSI value of the transmitted wireless signal (transmitted from antenna 212) at the personal computing device 210 can be less than a RSSI threshold value.

The processor 269 can execute receive instructions 274 to receive a notification indicative of a printable file stored in memory of the personal computing device 210. In various examples, the processor 269 can execute receive instructions 274 to receive such a notification when the RSSI value is less than the RSSI threshold value. For instance, such a notification can be provided to the processor 269 by the personal computing device 210 when the RSSI value is less than the RSSI threshold value.

In various examples, the processor 269 can execute authorize instructions 276 to authorize, via a wireless communication to the personal computing device, the printable file to be sent from the personal computing devisee 210 to a printer. In some examples, the processor 269 can receive a user provided input via a GUI of the mobile electronic device 220, as described herein, that authorizes the printable file to be sent from the personal computing device 210 to the printer. For example, a user provided input via the GUI of the mobile electronic device 220 can occur following the user unlocking the mobile electronic device. For example, unlocking can occur based on a user provided gesture, PIN, or biometric authentication (e.g., a fingerprint), among other possibilities.

Figure 3:
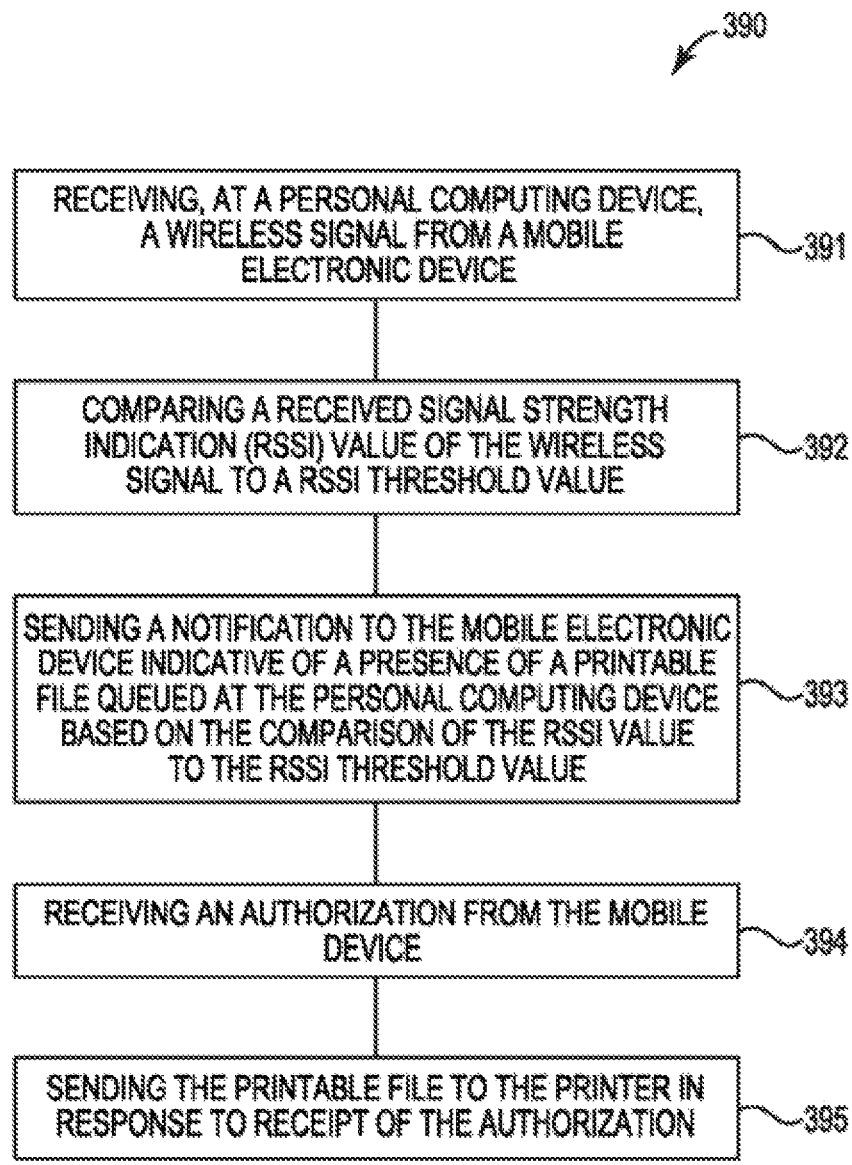
FIG. 3 illustrates a flow diagram of an example of a method of signal strength based printings according to the disclosure.

FIG. 3 illustrates a diagram of an example of a method 390 suitable with signal strength based printings according to the disclosure. As illustrated in FIG. 3, the method 390 can include receiving, at a personal computing device, a wireless signal from a mobile electronic device, as described herein.

As described herein, the method 390, can in various examples include comparing a received signal strength indication (RSSI) value of the wireless signal to a RSSI threshold value, as illustrated at 392. As illustrated at 393, the method 390 can include sending a notification to the mobile electronic device indicative of a presence of a printable file queued at the personal computing device based on the comparison of the RSSI value to the RSSI threshold value, as described herein. The notification can, in some examples be provided in response to comparison of a RSSI value to a RSSI threshold value. For instance, a notification can be sent to the mobile electronic device when a RSSI value is less than a RSSI threshold value. The notification can be displayed, via a GUI of a mobile electronic device.

The method 390 can include receiving an authorization from the mobile device, as illustrated at 394. For instance, the method 330 can include receiving an authorization from the mobile device in response to the notification to send the printable file to the printer, among other possibilities. The authorization can be provided by a mobile electronic device in response to receipt of a notification (e.g., a notification sent from the personal computing device) by a mobile electronic device. For example, a user can be prompted via a GUI of the mobile electronic device to either authorize or not authorize (e.g., by selection of a graphical user icon 'YES' or 'NO', respectively) a particular printable file in response to a notification sent from the personal computing device that the particular printable file is queued in memory of the personal computing device. A user can authorize a printable file by selection of a graphical icon (e.g., a 'YES' icon) displayed via the GUI of the mobile electronic device, among other possibilities. A user can opt to not authorize a printable file by selection of a graphical icon (e.g., a 'NO' icon) displayed via the GUI of the mobile electronic device, among other possibilities.

In this manner, authorization of printable files can be based on two factors. Such 'two-factor' authorization employing a user provided authorization from the mobile electronic device and comparison of the RSSI value to a RSSI threshold value can desirably provide enhanced printing security while utilizing a printer that may not have wireless communication capabilities and avoiding reliance on PINs and/or passwords input at the printer.

As illustrated at 395 the method 390 can include sending the printable file to the printer in response to receipt of the authorization. For example, a printable file queued at a personal computing device can be sent to a printer in response to receipt of the authorization provided at 394.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The figures herein follow a numbering convention in which the first digit corresponds to the drawing figure number and the remaining digits identify an element or component in the drawing. For example, reference numeral 110 can refer to element "10" in FIG. 1 and an analogous element can be identified by reference numeral 210 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

As used herein, "a number of" an element and/or feature can refer to one or more of such elements and/or features. It is understood that when an element is referred to as being "on," "connected to", "coupled to", or "coupled with" another element, it can be directly on, connected to, or coupled with the other element or intervening elements can be present.

What is claimed:

1. A personal computing device, comprising:
   a network adapter coupled to a computer network;
   an antenna to receive a wireless signal from a mobile electronic device;
   a memory; and
   a processor to:
   compare a signal strength indication (RSSI) value of the received wireless signal to a RSSI threshold value;
   queue an entire printable file in the memory;
   provide a notification to the mobile electronic device that the entire printable file is queued in the memory when the RSSI value is less than the RSSI threshold value; and
   send, via the network adapter, the entire printable file to a printer based on the comparison of the RSSI value to the RSSI threshold value.

2. The personal computing device of claim 1, wherein the processor is to determine the RSSI threshold value based on a user performed calibration.

3. The personal computing device of claim 2, wherein the processor is to prompt a mobile electronic device to transmit a plurality of wireless signals corresponding to respective locations between a location of the printer and a location of the personal computing device to determine the RSSI threshold value.

4. The personal computing device of claim 1, wherein the processor is to receive the wireless signal via a Bluetooth low energy transmission received by the antenna.

5. The personal computing device of claim 1, wherein the processor is to receive an authorization from the mobile electronic device to print the printable file, and wherein the processor is to send the printable file to the printer in response to receiving the authorization.

6. A non-transitory computer readable storage medium comprising instructions that when executed cause a processor of a computing device to:
   transmit, via an antenna, a wireless signal to a personal computing device, wherein a received signal strength indication (RSSI) value of the transmitted wireless signal at the personal computing device is less than a RSSI threshold value;
   receive a notification indicative of a printable file stored in memory of the personal computing device when the RSSI value is less than the RSSI threshold value; and
   authorize, via a wireless communication to the personal computing device, the printable file to be sent from the personal computing device to a printer.

7. The medium of claim 6, further including instructions to display the notification via a graphical user interface of a mobile electronic device.

8. The medium of claim 7, further including instructions to display the notification in response to unlocking the mobile electronic device.

9. The medium of claim 8, further including instructions to authorize the printable file to be sent in response to a user provided input to the GUI of the mobile electronic device.

10. A method, comprising:
    receiving, at a personal computing device, a wireless signal from a mobile electronic device;
    comparing a received signal strength indication (RSSI) value of the wireless signal to a RSSI threshold value;
    sending a notification to the mobile electronic device indicative of a presence of a printable file queued at the personal computing device when the RSSI value is less than the RSSI threshold value;
    receiving an authorization from the mobile electronic device; and
    sending the printable file to a printer in response to receipt of the authorization.

11. The method of claim 10, including receiving the authorization from the mobile device in response to the notification to send the printable file to the printer.

\* \* \* \* \*